(12) United States Patent
Okamoto et al.

(10) Patent No.: US 8,186,472 B2
(45) Date of Patent: May 29, 2012

(54) PEDESTRIAN PROTECTION AIRBAG DEVICE

(75) Inventors: Yutaka Okamoto, Wako (JP); Yuji Kikuchi, Wako (JP); Koichi Kamiji, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 83 days.

(21) Appl. No.: 12/743,722

(22) PCT Filed: Nov. 18, 2008

(86) PCT No.: PCT/JP2008/070942
§ 371 (c)(1),
(2), (4) Date: May 19, 2010

(87) PCT Pub. No.: WO2009/066660
PCT Pub. Date: May 28, 2009

(65) Prior Publication Data
US 2010/0252351 A1    Oct. 7, 2010

(30) Foreign Application Priority Data

Nov. 20, 2007  (JP) .................................. 2007-300747
Nov. 7, 2008   (JP) .................................. 2008-287095

(51) Int. Cl.
    *B60R 21/34*    (2011.01)
(52) U.S. Cl. ............... 180/274; 296/187.04; 296/203.02
(58) Field of Classification Search .................. 180/274, 180/69.2; 296/187.04, 203.02
    See application file for complete search history.

(56) References Cited

U.S. PATENT DOCUMENTS

| | | | |
|---|---|---|---|
| 5,615,914 A | 4/1997 | Galbraith et al. | |
| 5,934,743 A * | 8/1999 | Nohr et al. | 296/187.06 |
| 6,386,623 B1 | 5/2002 | Ryan et al. | |
| 7,174,986 B2 * | 2/2007 | Takimoto | 180/274 |
| 8,006,997 B2 * | 8/2011 | Inoue et al. | 280/728.2 |
| 2005/0257979 A1 * | 11/2005 | Hamada et al. | 180/274 |
| 2010/0252350 A1 * | 10/2010 | Hayashi et al. | 180/274 |

FOREIGN PATENT DOCUMENTS

| | | |
|---|---|---|
| GB | 2312190 | 10/1997 |
| GB | 2397559 | 7/2004 |
| JP | 7-108903 | 4/1995 |
| JP | 10217903 | 8/1998 |
| JP | 2000-219094 | 8/2000 |
| JP | 2000-264146 | 9/2000 |
| JP | 2001-122063 | 5/2001 |
| JP | 2004-500274 | 1/2004 |
| WO | 0050270 | 8/2000 |
| WO | 0198118 | 12/2001 |
| WO | 2004/065180 A1 | 8/2004 |

* cited by examiner

*Primary Examiner* — Drew Brown
(74) *Attorney, Agent, or Firm* — Rankin, Hill & Clark LLP

(57) ABSTRACT

A pedestrian protection airbag device is provided in which an airbag (34) having a closed cross section is formed by inflating and deploying a front outer panel (16) and a front inner panel (18) of a front pillar (15) by means of high pressure gas generated by an inflator (26). This enables the head of a pedestrian to be protected from an impact due to collision with the front pillar (15). Furthermore, since impact absorption performance is exhibited by plastic deformation of the deployed airbag (34), as long as deployment of the airbag (34) is completed before restraining the pedestrian, it is unnecessary to subsequently control the internal pressure of the airbag (34), and it becomes possible for an effective impact absorption performance to always be exhibited regardless of the vehicle speed at the time of collision or the physique of the pedestrian while simplifying the specification of the inflator (26) and reducing the cost.

11 Claims, 12 Drawing Sheets

AIRBAG DEPLOYED STATE

AIRBAG DEPLOYED STATE

FIG.8
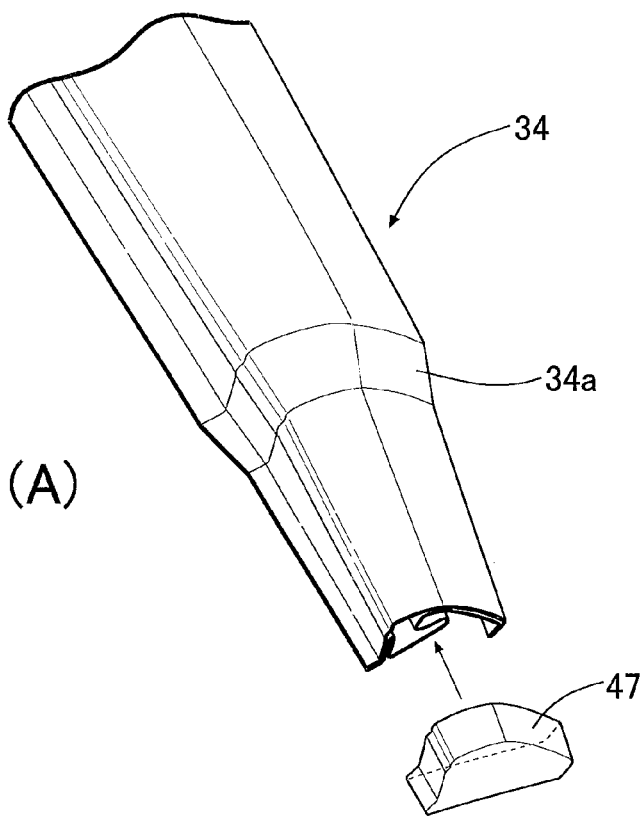
(A)
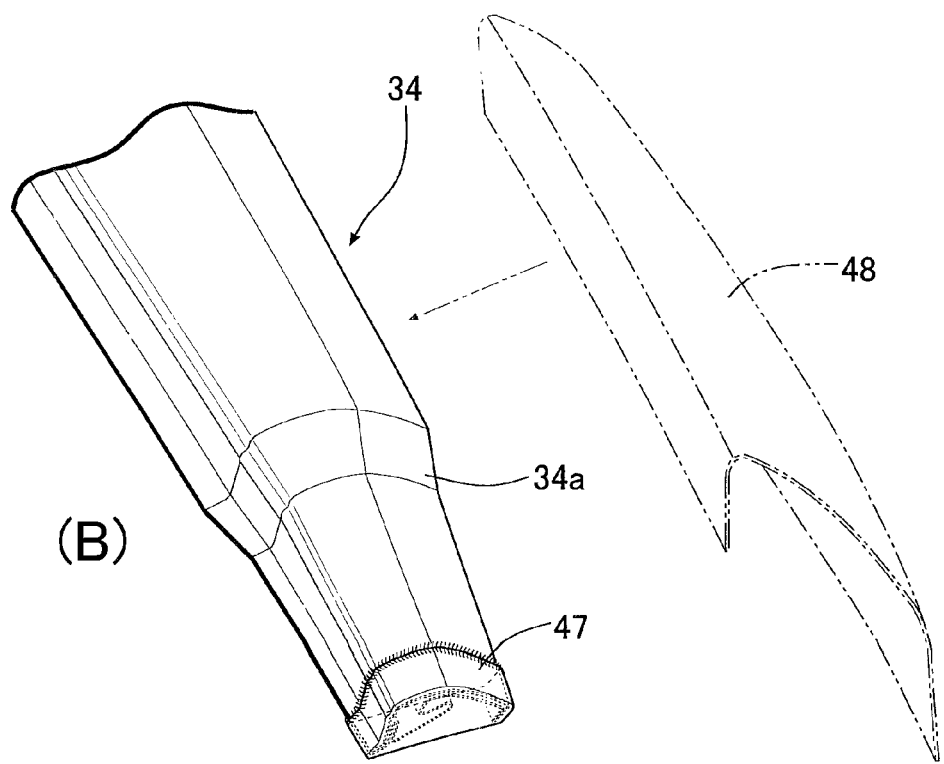
(B)

PEDESTRIAN PROTECTION AIRBAG DEVICE

TECHNICAL FIELD

The present invention relates to a pedestrian airbag device that protects a pedestrian involved in a collision with a vehicle from the impact by using an airbag formed from a metal material.

BACKGROUND ART

An arrangement is known from Patent Document 1 below in which, in order to protect a pedestrian who has been thrown up by a vehicle onto a hood from the impact, a collapsible space for absorbing the impact is formed by slightly raising the rear end of the hood and, furthermore, a pillar bag is deployed from the interior of an engine compartment along left and right front pillars and a laceration prevention film covering the front face of the windshield is deployed between the left and right pillar bags.

Patent Document 1: Japanese Patent Application Laid-open No. 2000-264146

DISCLOSURE OF INVENTION

Problems to be Solved by the Invention

Incidentally, the time taken for the head of a pedestrian who has been thrown up by a vehicle onto a hood to collide with a front pillar changes according to the vehicle speed at the time of collision and the physique of the pedestrian, and since a conventional fabric airbag shrinks after being deployed due to gas escaping via a vent hole, the period of time for which it exhibits an impact absorbing ability is limited, and it is difficult for an effective impact absorbing ability to be exhibited regardless of the vehicle speed at the time of collision or the physique of a pedestrian.

The present invention has been accomplished in light of the above-mentioned circumstances, and it is an object thereof to provide a pedestrian airbag device that can exhibit an effective impact absorbing ability regardless of the vehicle speed at the time of a collision or the physique of a pedestrian.

Means for Solving the Problems

In order to attain the above object, according to a first aspect of the present invention, there is provided a pedestrian protection airbag device comprising a metal airbag having a closed cross section and comprising an exposed portion that is visibly exposed and an expansion portion that is invisibly covered and expandably folded, the airbag being inflated by high pressure gas generated by an inflator at the time of a collision of a vehicle to thus protect a pedestrian from the impact of the collision.

Furthermore, according to a second aspect of the present invention, in addition to the first aspect, there is provided the pedestrian protection airbag device, wherein at least part of the inflator is housed in the interior of the airbag.

Moreover, according to a third aspect of the present invention, in addition to the first or second aspect, there is provided the pedestrian protection airbag device, wherein the exposed portion of the airbag forms a decorative surface of a front pillar.

Furthermore, according to a fourth aspect of the present invention, in addition to the third aspect, there is provided the pedestrian protection airbag device, wherein the airbag forms a substantially cylindrical shape in a deployed state.

Moreover, according to a fifth aspect of the present invention, in addition to the fourth aspect, there is provided the pedestrian protection airbag device, wherein the airbag is formed by joining a first metal member forming the exposed portion and a second metal member forming the expansion portion.

Furthermore, according to a sixth aspect of the present invention, in addition to the fifth aspect, there is provided the pedestrian protection airbag device, wherein the airbag is formed by providing a connection between the inflator and opposite edges of the first metal member by two of the second metal members.

Moreover, according to a seventh aspect of the present invention, in addition to the fifth aspect, there is provided the pedestrian protection airbag device, wherein the exposed portion and the expansion portion of the airbag are formed integrally by roll forming or extrusion molding.

Furthermore, according to an eighth aspect of the present invention, in addition to the seventh aspect, there is provided the pedestrian protection airbag device, wherein the airbag forms part of a front pillar, the inflator is disposed in a middle part in a vehicle width direction of the expansion portion, and a part of the expansion portion that is further inside in the vehicle width direction than the inflator is folded in a vehicle body fore-and-aft direction so that the folds overlap one another.

Moreover, according to a ninth aspect of the present invention, in addition to the eighth aspect, there is provided the pedestrian protection airbag device, wherein the airbag forms part of a front pillar, the inflator is disposed in a middle part in a vehicle width direction of the expansion portion, and a part of the expansion portion that is further outside in the vehicle width direction than the inflator is made to follow a rear face of the exposed portion.

Furthermore, according to a tenth aspect of the present invention, in addition to the ninth aspect, there is provided the pedestrian protection airbag device, wherein the exposed portion covers a section between an outer edge in a vehicle width direction of a front windshield and a front edge of a front door.

Moreover, according to an eleventh aspect of the present invention, in addition to the seventh aspect, there is provided the pedestrian protection airbag device, wherein a front pillar main body comprises a front face that is parallel to a front windshield and a side face that curves from the front face toward the rear of a vehicle body, the inflator is disposed on the front face, and a part of the expansion portion that is further outside in a vehicle width direction than the inflator comprises a first portion that extends along a rear face of the exposed portion at a position far from the inflator and a second portion that is folded in a zig-zag manner in the vehicle width direction at a position close to the inflator.

Furthermore, according to a twelfth aspect of the present invention, in addition to the eleventh aspect, there is provided the pedestrian protection airbag device, wherein a middle part of the first portion is curved rearward so as to abut against the side face of the front pillar main body.

Here, a front outer panel 16 of embodiments corresponds to the first metal member of the present invention, and a front inner panel 18 and a middle panel 32 of the embodiments correspond to the second metal member of the present invention.

Effects of the Invention

In accordance with the first aspect of the present invention, since the metal airbag having a closed cross section is formed from an exposed portion that is visibly exposed and an expansion portion that is invisibly covered and expandably folded, a pedestrian can be protected from the impact of a collision by the airbag being inflated with high pressure gas generated by an inflator at the time of the collision. Furthermore, since impact absorption performance is exhibited by plastic deformation of the deployed airbag, as long as deployment of the air bag is completed before a pedestrian is restrained, it then becomes unnecessary to carry out subsequent control of the inner pressure of the airbag, and an effective impact absorption performance can always be exhibited regardless of the vehicle speed at the time of collision or the physique of a pedestrian while simplifying the specification of the inflator and reducing the cost. Moreover, utilizing the exposed portion, which becomes the visible exterior of a vehicle body, as part of the airbag enables the number of components to be cut.

Furthermore, in accordance with the second aspect of the present invention, since at least part of the inflator is housed in the interior of the airbag, compared with a case in which an inflator is disposed outside an airbag, not only does the space efficiency improve, but it is also possible to simplify the structure by making piping for connecting the inflator and the airbag unnecessary.

Moreover, in accordance with the third aspect of the present invention, since the exposed portion of the airbag forms a decorative surface of the front pillar, not only does the airbag protect effectively the head of a pedestrian who has been thrown up onto the hood and is colliding with the front pillar, but it is also possible to eliminate degradation of the appearance due to incorporation of the airbag device into the front pillar.

Furthermore, in accordance with the fourth aspect of the present invention, since the airbag forms a substantially cylindrical shape in a deployed state, when the head of a pedestrian collides therewith, a maximum impact absorption effect can be exhibited.

Moreover, in accordance with the fifth aspect of the present invention, since the airbag is formed by joining a first metal member forming the exposed portion and a second metal member forming the expansion portion, it is possible to simplify the shapes of the first and second metal members, thus making it easy to machine them and thereby contributing to a reduction in cost.

Furthermore, in accordance with the sixth aspect of the present invention, since the airbag is formed by connecting the inflator and opposite edges of the first metal member via the two second metal members, making the two metal members expand increases the diameter of the airbag in the deployed state, thus enhancing the impact absorption effect.

Moreover, in accordance with the seventh aspect of the present invention, since the exposed portion and the expansion portion of the airbag are molded integrally by roll forming or extrusion molding, not only is it possible to form the member having a closed cross section from one member to thus cut the number of components, but it is also possible to restrain a pedestrian gently since no seams between members are formed on the face via which a pedestrian is restrained in a deployed state of the airbag.

Furthermore, in accordance with the eighth aspect of the present invention, since the airbag forms part of the front pillar, not only is it possible for the airbag to restrain a pedestrian who is colliding with the front pillar, but also since the inflator is disposed in a middle part in the vehicle width direction of the expansion portion and a part of the expansion portion that is further inside in the vehicle width direction than the inflator is folded back in the vehicle body fore-and-aft direction so that the folds overlap one another, it is possible to sufficiently inflate the airbag toward the front of the vehicle body from the front pillar, thus guaranteeing a sufficient impact absorption stroke of the airbag for a pedestrian who is colliding with the front pillar from the front of the vehicle body.

Moreover, in accordance with the ninth aspect of the present invention, since the airbag forms part of the front pillar, not only can a pedestrian who is colliding with the front pillar be restrained by the airbag, but also since the inflator is disposed in a middle part in the vehicle width direction of the expansion portion and a part of the expansion portion that is further outside in the vehicle width direction than the inflator is made to follow the rear face of the exposed portion, even if the part of the expansion portion that is further outside in the vehicle width direction than the inflator extends lengthwise toward the rear of the vehicle body, the expansion portion can be easily inflated, thus sufficiently inflating the airbag toward the front of the vehicle body from the front pillar.

Furthermore, in accordance with the tenth aspect of the present invention, since the exposed portion covers a section between the outer edge in the vehicle width direction of the front windshield and the front edge of the front door, it is possible to prevent a gap from being formed, thus avoiding any degradation in appearance.

Moreover, in accordance with the eleventh aspect of the present invention, since the inflator is disposed on the front face of the front pillar main body, and a part of the expansion portion that is further outside in the vehicle width direction than the inflator is formed from a first portion extending along the rear face of the exposed portion at a position far from the inflator and a second portion folded back in a zig-zag manner in the vehicle width direction at a position close to the inflator, it is possible to guarantee a large expansion allowance for the expansion portion on the front pillar front face side, thus enabling the airbag to be sufficiently inflated toward the front of the vehicle body from the front pillar.

Furthermore, in accordance with the twelfth aspect of the present invention, since the middle part of the first portion of the expansion portion is curved rearward and made to abut against the side face of the front pillar main body, transmitting a load imposed on the exposed portion from the outside of the vehicle body to the front pillar main body via the curved portion of the expansion portion enables the rigidity of the exposed portion to be enhanced without requiring a special reinforcing member.

BRIEF DESCRIPTION OF DRAWINGS

FIG. 8 is a perspective view of a lower part of the front pillar (third embodiment).

EXPLANATION OF REFERENCE NUMERALS AND SYMBOLS

Figure 1:
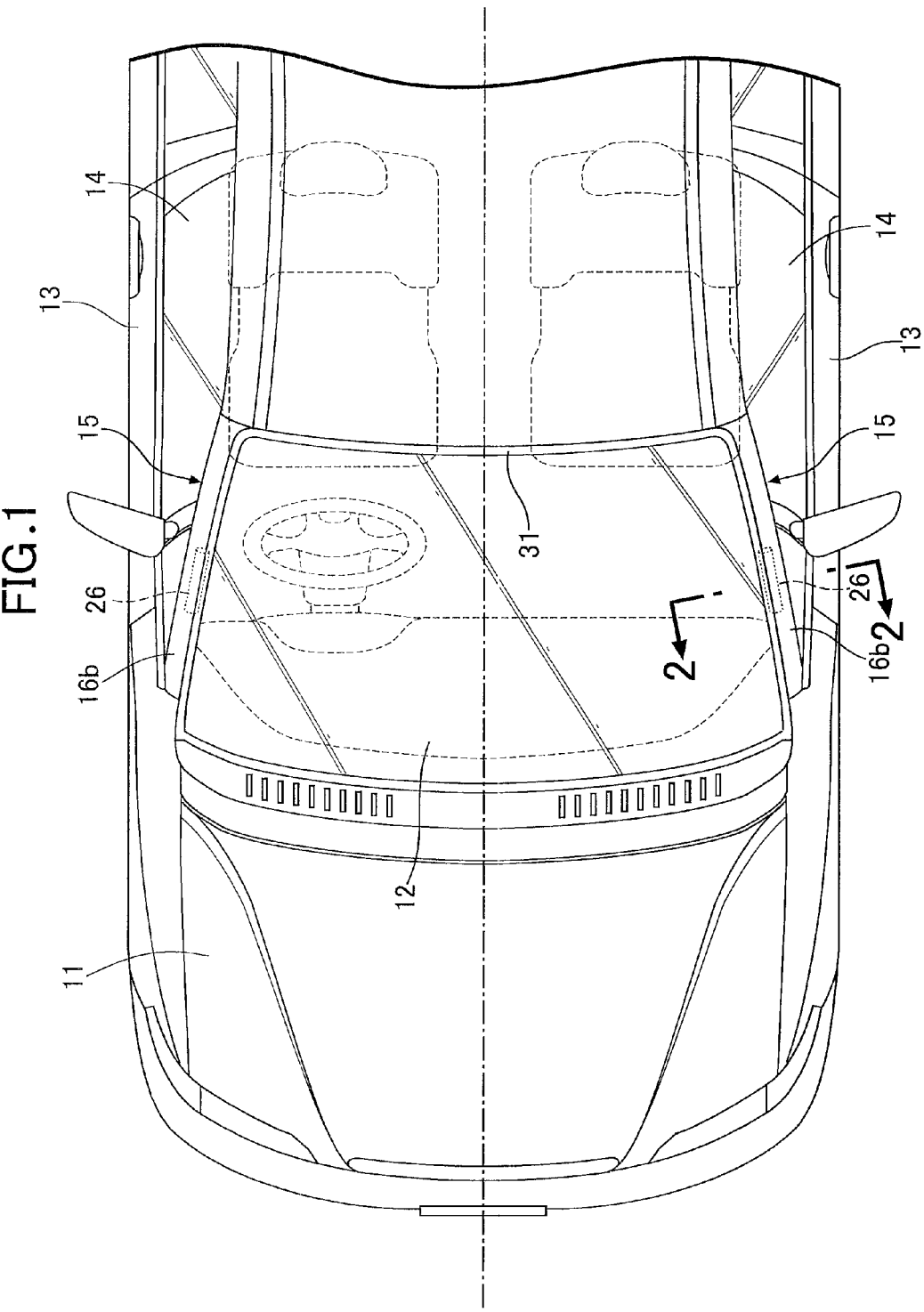
FIG. 1 is a plan view of a vehicle body front part of an automobile related to a first embodiment (first embodiment).

12 Front windshield
13 Front door
15 Front pillar
16 Front outer panel (first metal member)
16b Decorative surface
18 Front inner panel (second metal member)
26 Inflator
32 Middle panel (second metal member)
34 Airbag
41 Exposed portion
41a Decorative surface
42 Expansion portion

BEST MODE FOR CARRYING OUT THE INVENTION

Modes for carrying out the present invention are explained below by reference to the attached drawings.
First Embodiment FIG. 1 to FIG. 4 show a first embodiment of the present invention.

As shown in FIG. 1, an automobile is equipped with a front windshield 12 to the rear of a hood 11, and front pillars 15 and 15 are disposed so as to be interposed between left and right opposite edges of the front windshield 12 and door glass 14 and 14 of front doors 13 and 13.

Figure 2:
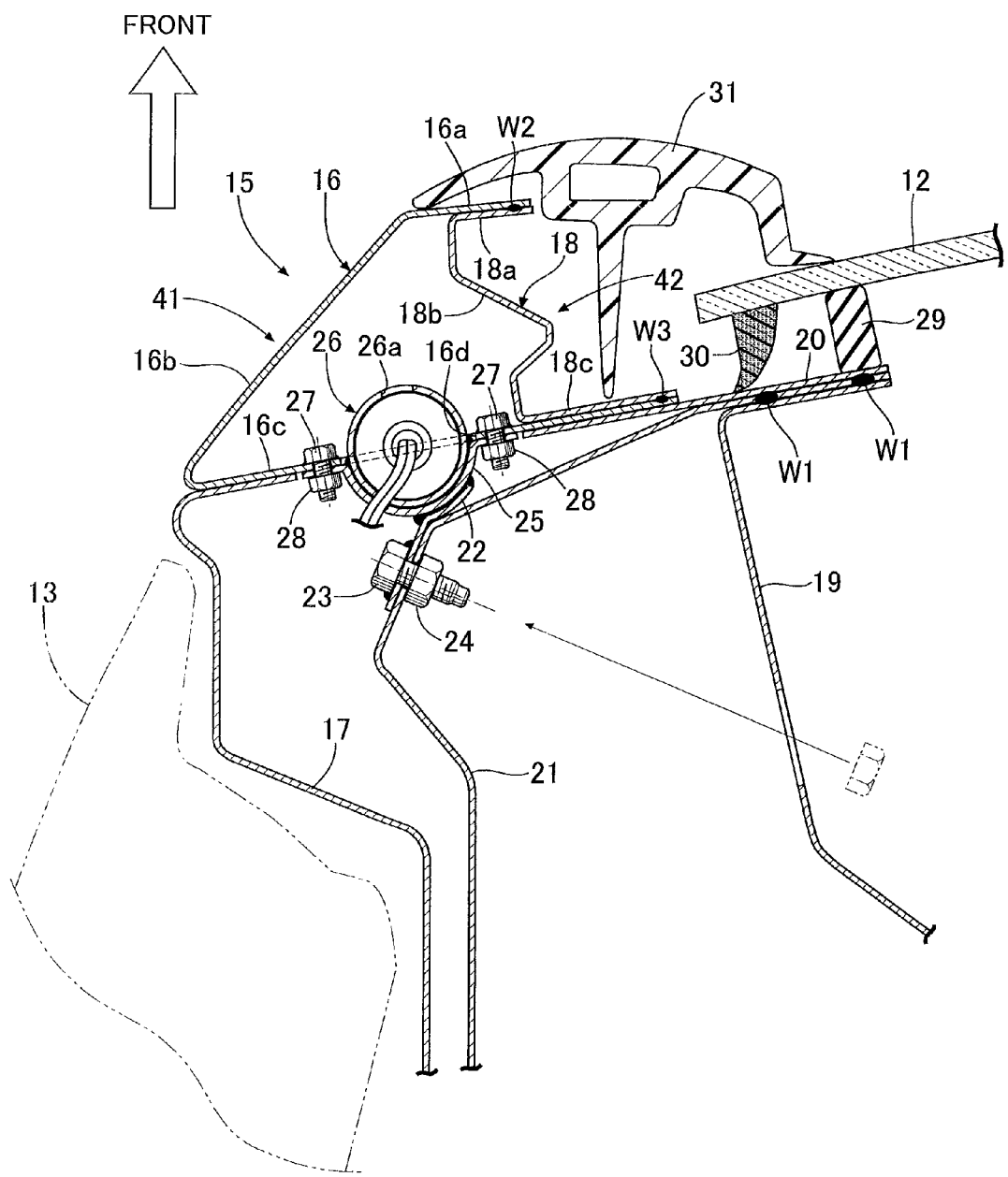
FIG. 2 is an enlarged sectional view along line 2-2 in FIG. 1 (first embodiment).

As shown in FIG. 2, the front pillar 15 of this embodiment includes a front outer panel 16 and rear outer panel 17 positioned outside a vehicle body, a front inner panel 18 and rear inner panel 19 positioned inside the vehicle body, and a front stiffener 20 and rear stiffener 21 connecting and reinforcing the four panels 16 to 19.

Inner ends in the vehicle width direction of the rear inner panel 19, the rear stiffener 21, and the front stiffener 20 are superimposed as three sheets and spot welded with welds W1 and W1. The front outer panel 16 includes a decorative surface 16b exposed to an outer face of the vehicle body, a front flange 16a extending from the front end of the decorative surface 16b inward in the vehicle width direction, and a rear flange 16c extending from the rear end of the decorative surface 16b inward in the vehicle width direction. The front inner panel 18 includes a front flange 18a and rear flange 18c extending toward the inside in the vehicle width direction, and a bent portion 18b connecting them in a zig-zag manner. The decorative surface 16b of the front outer panel 16 forms an exposed portion 41 of the present invention, and the front flange 16a and the rear flange 16c of the front outer panel 16 and the front inner panel 18 form an expansion portion 42 of the present invention.

Figure 3:
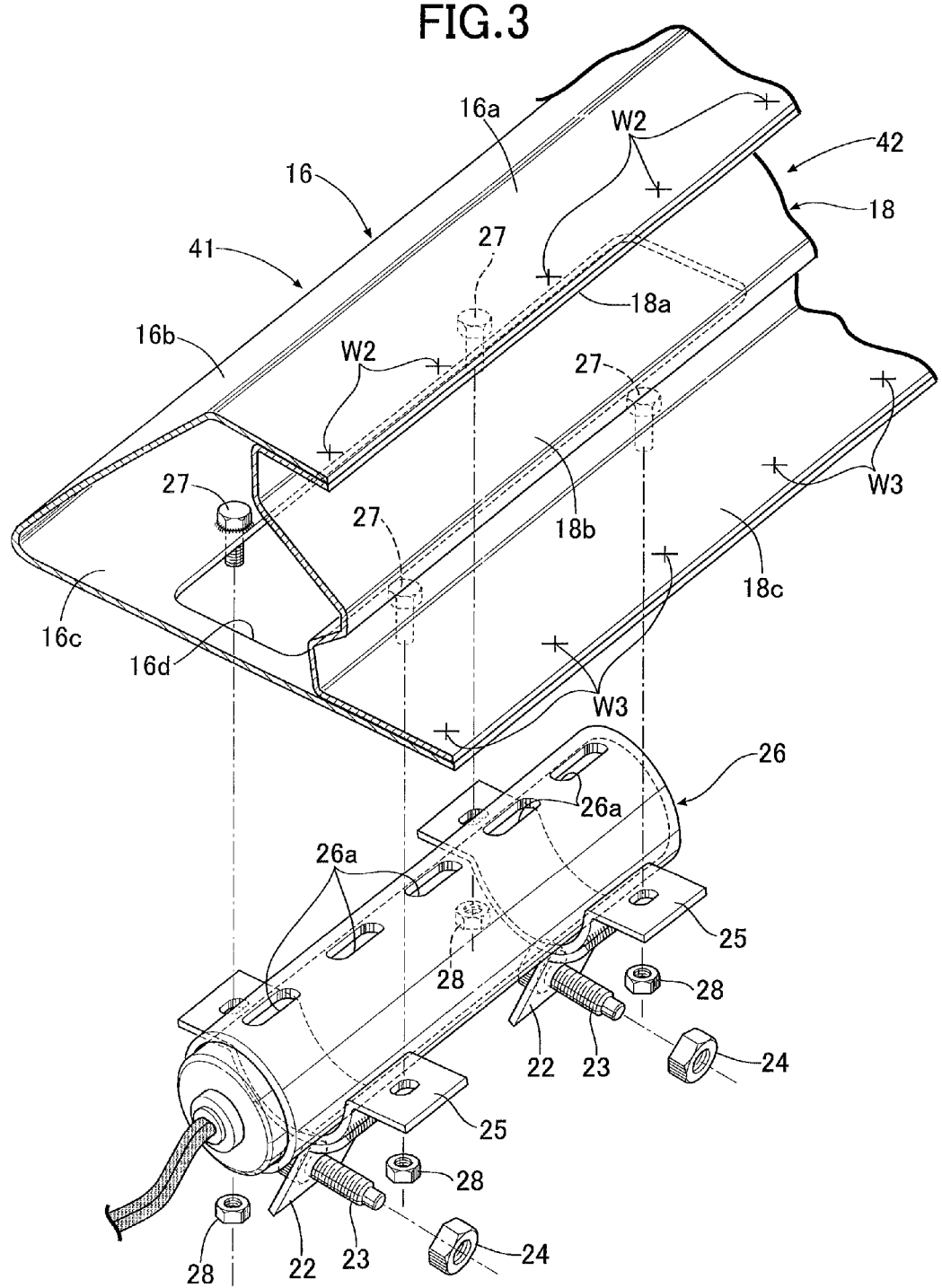
FIG. 3 is an exploded perspective view of an airbag and an inflator (first embodiment).
Figure 4:
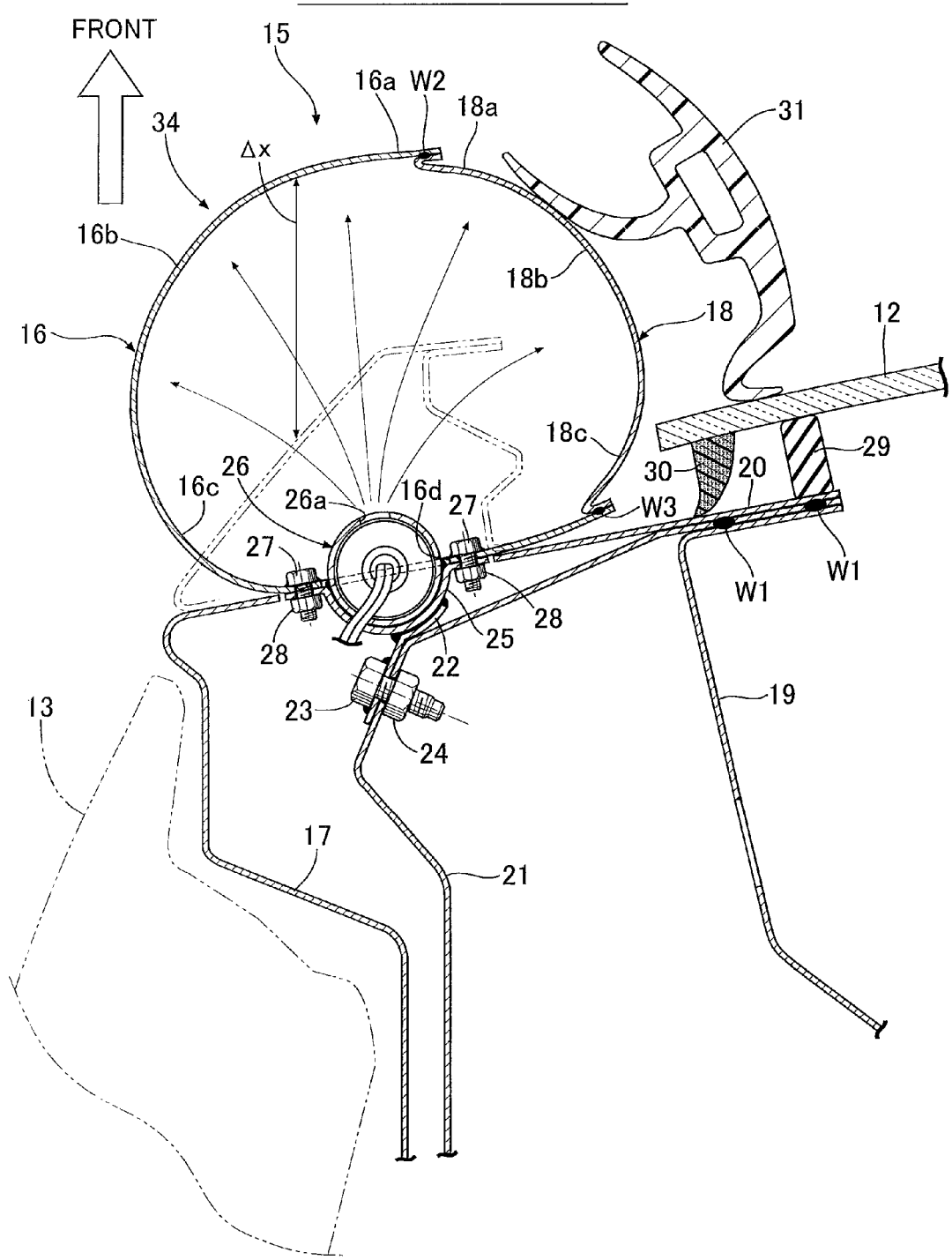
FIG. 4 is a diagram, corresponding to FIG. 2, for explaining the operation when the airbag is deployed (first embodiment).

As is clear from FIG. 2 and FIG. 3, the inner end in the vehicle width direction of the front flange 16a of the front outer panel 16 and the inner end in the vehicle width direction of the front flange 18a of the front inner panel 18 are superimposed as two sheets and spot welded with a weld W2, and inner ends in the vehicle width direction of the rear flange 16c of the front outer panel 16 and the rear flange 18c of the front inner panel 18 are superimposed as two sheets and spot welded with a weld W3.

Two brackets 22 and 22 are each fixed to an outer face in the vehicle width direction of the rear stiffener 21 by a bolt 23 and a nut 24, halved cylindrical inflator support members 25 and 25 are welded to these brackets 22 and 22, and these inflator support members 25 and 25 are welded so as to extend over half of the periphery of an outer peripheral face of a substantially columnar inflator 26. The inflator 26, which is positioned so as to fit without a gap into a rectangular opening 16d formed in the rear flange 16c of the front outer panel 16, is fixed by nuts 28 and 28 and bolts 27 and 27 that extend through opposite ends of the inflator support members 25 and the rear flange 16c of the front outer panel 16. In this state, a plurality of gas ejection holes 26a are formed in one side face of the inflator 26 facing an inner space of the front outer panel 16 and the front inner panel 18.

The front outer panel 16 and the front inner panel 18 are integrated by the welds W2 and W3, and the rear outer panel 17, the rear inner panel 19, the front stiffener 20, and the rear stiffener 21 are integrated by the welds W1 and W1 and a weld on the vehicle body rear side, which is not illustrated, but the rear flange 16c of the front outer panel 16 is not welded to the front face of the rear outer panel 17 and the front face of the front stiffener 20 and is merely in surface contact therewith, these being indirectly connected via the inflator support members 25 and 25 fixed to the rear flange 16c of the front outer panel 16 and the brackets 22 and 22 fixed to the rear stiffener 21.

The front windshield 12 is fixed to the front face on the inside in the vehicle width direction of the front stiffener 20 via a dam rubber 29 and an adhesive 30, and a molding 31 is installed between the front face of the front windshield 12 and the front face of the front flange 16a of the front outer panel 16.

Next, the operation of the embodiment of the present invention having the above-mentioned arrangement is explained.

When an impact resulting from a collision of the front of the vehicle with a pedestrian is detected, high pressure gas is ejected into the interior of the front outer panel 16 and the front inner panel 18 from the gas ejection holes 26a of the inflators 26 and 26 housed in the interior of the left and right front pillars 15 and 15. As a result, the expansion portion 42 of the front pillar 15 expands greatly and the exposed portion 41 expands slightly, that is, the front inner panel 18, which has been folded in a zig-zag manner, expands into an arc shape, and the front outer panel 16 also expands into an arc shape, and a substantially cylindrical airbag 34 is thereby inflated and deployed on the front faces of the rear outer panel 17, the rear inner panel 19, the front stiffener 20, and the rear stiffener 21 of the front pillar 15.

As a result, when the head of a pedestrian who has been scooped up onto the hood 11 collides with the front pillar 15, the cylindrical airbag 34 covering the front face thereof easily collapses to thus absorb the impact, thereby protecting the head of the pedestrian.

The timing with which the head of a pedestrian collides with the front pillar 15 variously changes depending on the vehicle speed at the time of collision and the physique of the pedestrian. but since the metal airbag 34 of the present embodiment exhibits impact absorption performance by plastic deformation thereof, as long as deployment of the airbag 34 is completed before the head of the pedestrian collides therewith, it is unnecessary to control the deployment speed or the internal pressure of the inner airbag 34 in accordance with the timing of the collision, and it is possible for effective impact absorption ability to always be exhibited while simplifying the specification of the inflator 26 to thus reduce the cost.

In addition, a general fabric airbag controls internal pressure by a balance between the pressure of high pressure gas generated by an inflator and the amount of gas escaping through a vent hole, but the airbag 34 of the present embodiment is made of a thin metal and has a structure that absorbs impact by undergoing plastic deformation so that the metal sheet thereof collapses, and it is therefore unnecessary to control the internal pressure of the airbag 34. Therefore, there are not really any problems with respect to a seam between the front outer panel 16 and the front inner panel 18 that are welded (spot welded) with welds W2 and W3 or the amount of gas leaking past an outer peripheral area of the opening 16d for fixing the inflator 26 to the front outer panel 16. In summary, the performance of the inflator 26 may be determined so that deployment of the airbag 34 is completed before the head of a pedestrian collides therewith.

Furthermore, utilizing the decorative surface 16b of the front outer panel 16, which is a visible exterior part of the vehicle body, as part of the airbag 34 not only enables the number of components to be cut but also enables degradation in appearance due to an airbag device being incorporated into the front pillar 15 to be avoided.

Furthermore, since, among the front outer panel 16 and front inner panel 18 forming the airbag 34, the front inner panel 18 is formed in a bent zig-zag shape, the diameter of the airbag 34 is increased by the front inner panel 18 expanding into an arc shape, thereby enhancing the impact absorption effect. Moreover, since part of the inflator 26 is housed in the interior of the airbag 34, compared with a case in which the inflator 26 is disposed outside the airbag 34, not only is the space efficiency improved, but also the structure can be simplified by making piping for connecting the inflator 26 and the airbag 34 unnecessary.

Second Embodiment

Figure 5:
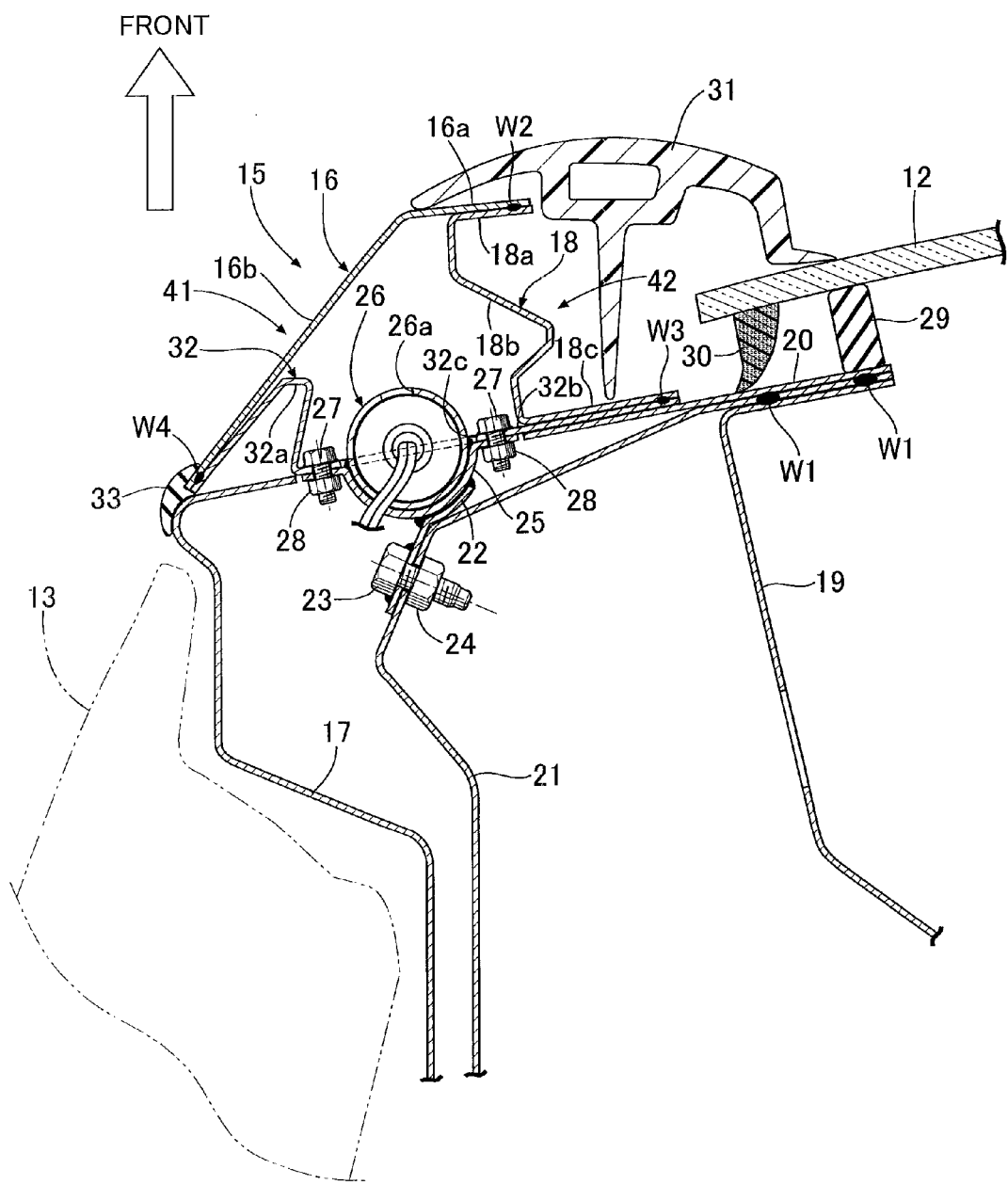
FIG. 5 is a transverse sectional view of a front pillar related to a second embodiment (second embodiment).
Figure 6:
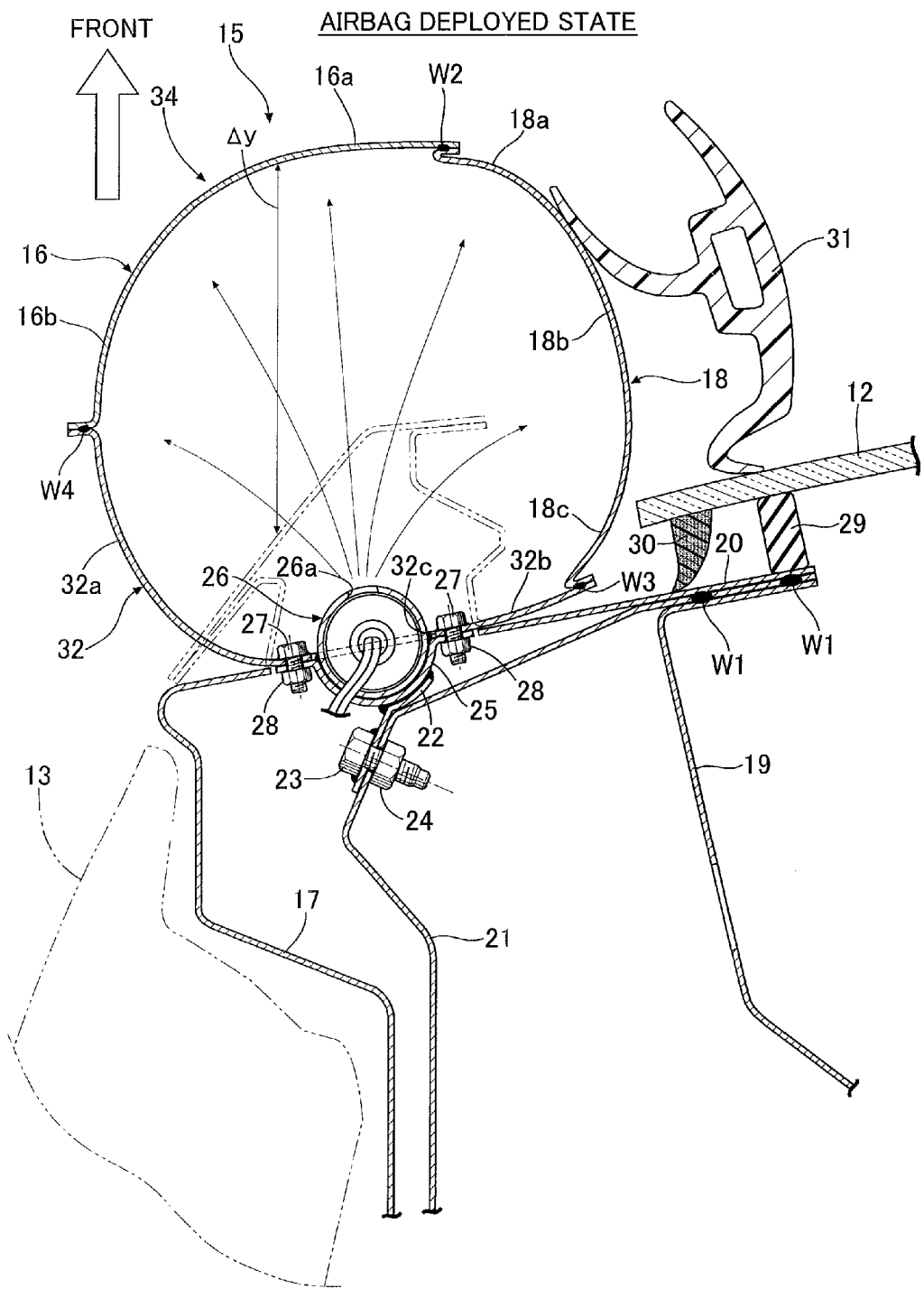
FIG. 6 is a diagram, corresponding to FIG. 5, for explaining the operation when an airbag is deployed (second embodiment).

FIG. 5 and FIG. 6 show a second embodiment of the present invention.

In the second embodiment, the rear flange 16c of the front outer panel 16 of the first embodiment is formed from a middle panel 32, which is a separate member from a decorative surface 16b. The outer end in the vehicle width direction of the middle panel 32 is superimposed on the rear end of the decorative surface 16b of the front outer panel 16 and welded with a weld W4. The middle panel 32 in the vicinity of the weld W4 is folded into a triangular shape so as to form a bent portion 32a, the tip end of a flat portion 32b extending from the bent portion 32a toward the inside in the vehicle width direction is welded with a weld W3 to a rear flange 18c of a front inner panel 18, and an inflator 26 is fitted into an opening 32c formed in the middle of the flat portion 32b. A rubber lip 33 is mounted on a section where the rear end of the front outer panel 16 and the outer end in the vehicle width direction of the middle panel 32 are connected.

In accordance with this second embodiment, an airbag 34 is formed from three members, that is, the front outer panel 16, the front inner panel 18, and the middle panel 32 and, moreover, since the front inner panel 18 and the middle panel 32 expand in an arc shape from a folded state at the time of deployment, the diameter of the deployed airbag 34 can be further increased to thus increase its allowance for collapsing, thereby further improving the impact absorption effect.

Third Embodiment

Figure 7:
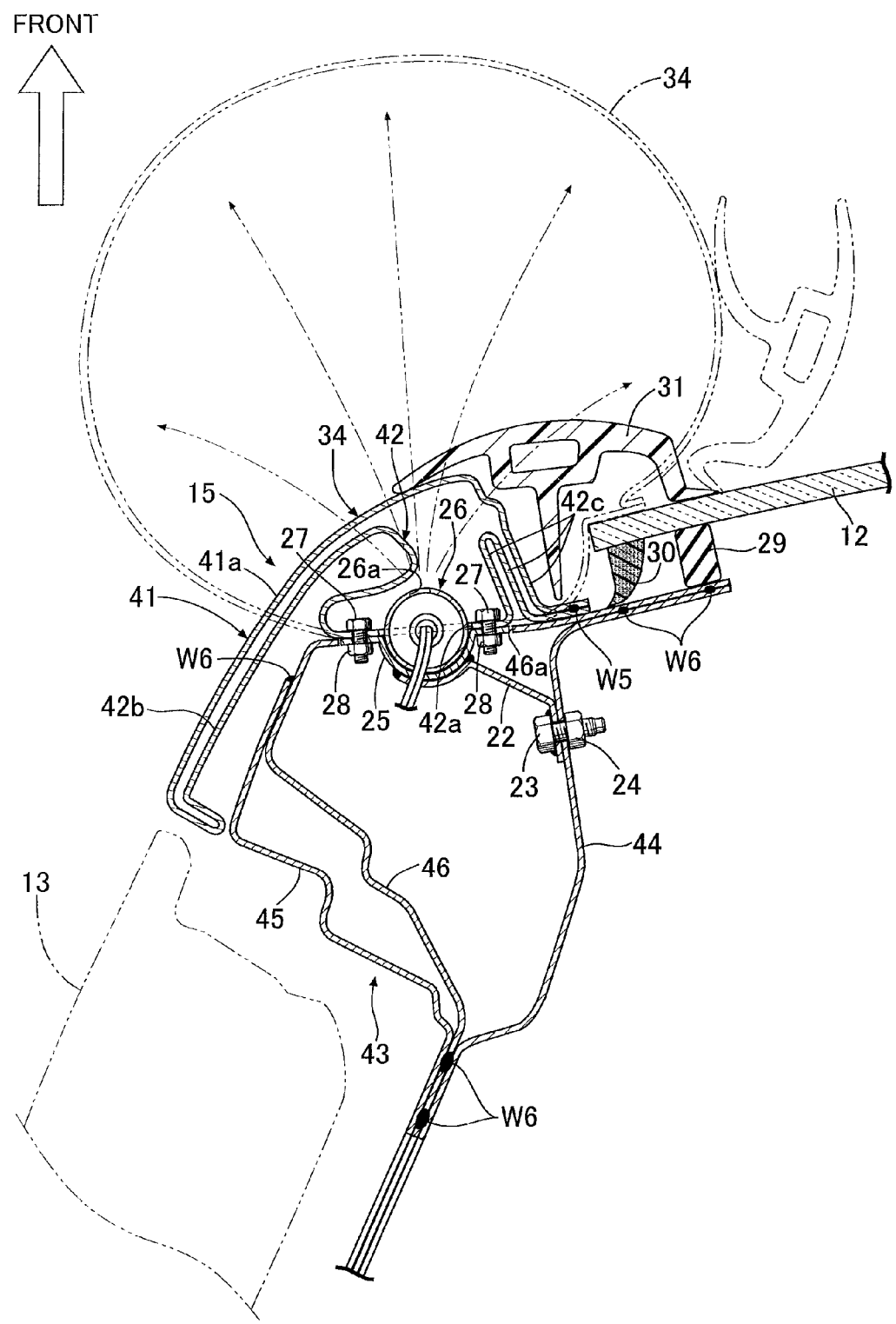
FIG. 7 is a transverse sectional view of a front pillar related to a third embodiment (third embodiment).

FIG. 7 and FIG. 8 show a third embodiment of the present invention.

In the third embodiment, an airbag 34 forming part of a front pillar 15 is integrally formed as a single metal member by roll forming. The airbag 34 has a closed cross section with its edges being welded with a weld W5, and is formed from an exposed portion 41 that is exposed outside a vehicle body so as to cover a section between the outer edge in the vehicle width direction of a front windshield 12 and the front edge of a front door 13, and an expansion portion 42 that is expandably bent so as to be invisibly hidden behind the exposed portion 41. The surface of the exposed portion 41, which is formed with an arc-shaped cross section, is a decorative surface 41a and is disposed so as to give, in cooperation with a molding 31, a smooth connection between the outer edge in the vehicle width direction of the front windshield 12 and the front edge of the front door 13. On the other hand, the expansion portion 42 has an opening 42a formed in a middle part thereof in the vehicle width direction, an inflator 26 being fitted into the opening 42a, a first portion 42b is formed on the outside, in the vehicle width direction, of the opening 42a so as to extend along a rear face of the exposed portion 41, and a second portion 42c is formed on the inside, in the vehicle width direction, of the opening 42a such that it is folded so as to overlap in three layers in the vehicle width direction and extend in the fore-and-aft direction of the vehicle body.

A front pillar main body 43, which corresponds to a portion of the front pillar 15 other than the airbag 34, is formed by integrally welding with a weld W6 an inner panel 44, an outer panel 45, and a stiffener 46, and the airbag 34 is disposed so as to extend over a front face of the stiffener 46 and a side face in the vehicle width direction of the outer panel 45.

Two brackets 22 and 22 are each fixed to outer faces in the vehicle width direction of the inner panel 44 by a bolt 23 and a nut 24, halved cylindrical inflator support members 25 and 25 are welded to these brackets 22 and 22, and these inflator support members 25 and 25 are welded so as to extend over half of the periphery of an outer peripheral face of the inflator 26, which is substantially columnar. Each inflator support member 25 is fitted into a rectangular opening 46a formed in the stiffener 46. With regard to the inflator 26, which is positioned so as to be fitted into the opening 42a of the expansion portion 42 of the airbag 34 without a gap, each inflator support member 25, which is integral with the inflator 26, is fixed to the airbag 34 by bolts 27 and 27 and nuts 28 and 28.

As is clear from FIG. 8, the lower end of the airbag 34 is shaped so as to be tapered via a step 34a, and airtightness of the airbag 34 is ensured by welding a cap 47 thereto. Fitting the edge of a front fender 48 onto the step 34a of the airbag 34 provides a smooth connection between a lower part of the front pillar 15 and an upper part of the front fender 48.

When the impact of a collision of the front of the vehicle with a pedestrian is detected, high pressure gas is ejected into the interior of the airbag 34 from gas ejection holes 26a of the inflators 26 and 26 housed in the interior of left and right front pillars 15 and 15. As a result, the expansion portion 42 of the airbag 34, which has been folded, expands, and the exposed portion 41 and the expansion portion 42 thereby inflate and deploy into a cylindrical shape in cooperation on the front face of the front pillar main body 43, thus protecting the head of the pedestrian who has been scooped up onto a hood 11 from the impact of collision with the front pillar 15 in the same manner as in the first and second embodiments.

Moreover, in accordance with the present embodiment, in addition to the operational effects of the first and second embodiments, since the airbag 34 is formed from one member that has been roll formed, compared with a case in which a plurality of members are integrated by welding, not only can the number of components be reduced and the cost be cut, but it is also possible to eliminate seams from the airbag 34, which tend to become rigid, thus gently restraining a pedestrian.

Furthermore, with regard to the airbag 34, since the degree of freedom in design of the shape of the expansion portion 42 is greatly enhanced by roll forming, by making the first portion 42b, which is further outside in the vehicle width direction (front door 13 side) than the inflator 26 disposed in a middle part in the vehicle width direction of the expansion portion 42, follow a rear face of the exposed portion 41, and making the second portion 42c, which is further inside in the vehicle width direction (front windshield 12 side) than the inflator 26 disposed in the middle part in the vehicle width direction of the expansion portion 42, extend in the vehicle body fore-and-aft direction and fold so as to overlap in three layers in the vehicle width direction, it is possible to guarantee a sufficiently large impact absorption stroke when a pedestrian is involved in a collision by deploying the second portion 42c, which has a large deployment allowance, to a great extent toward the front of the vehicle body and, moreover, in this process the first portion 42b expanding to the front of the vehicle body by being pulled by the second portion 42c can prevent the expansion of the second portion 42c to the front of the vehicle body from being inhibited.

Fourth Embodiment

Figure 9:
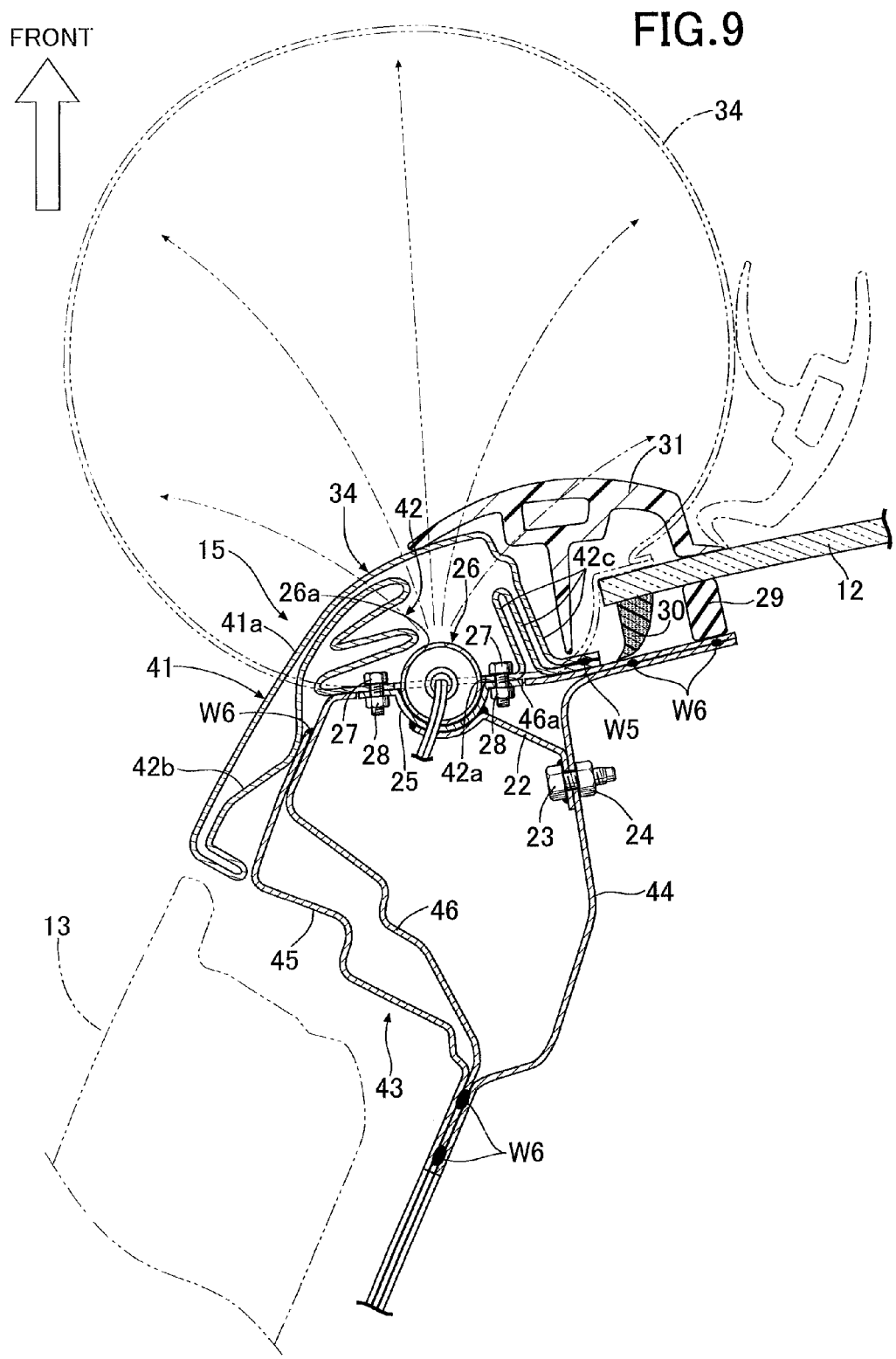
FIG. 9 is a transverse sectional view of a front pillar related to a fourth embodiment (fourth embodiment).
Figure 10:
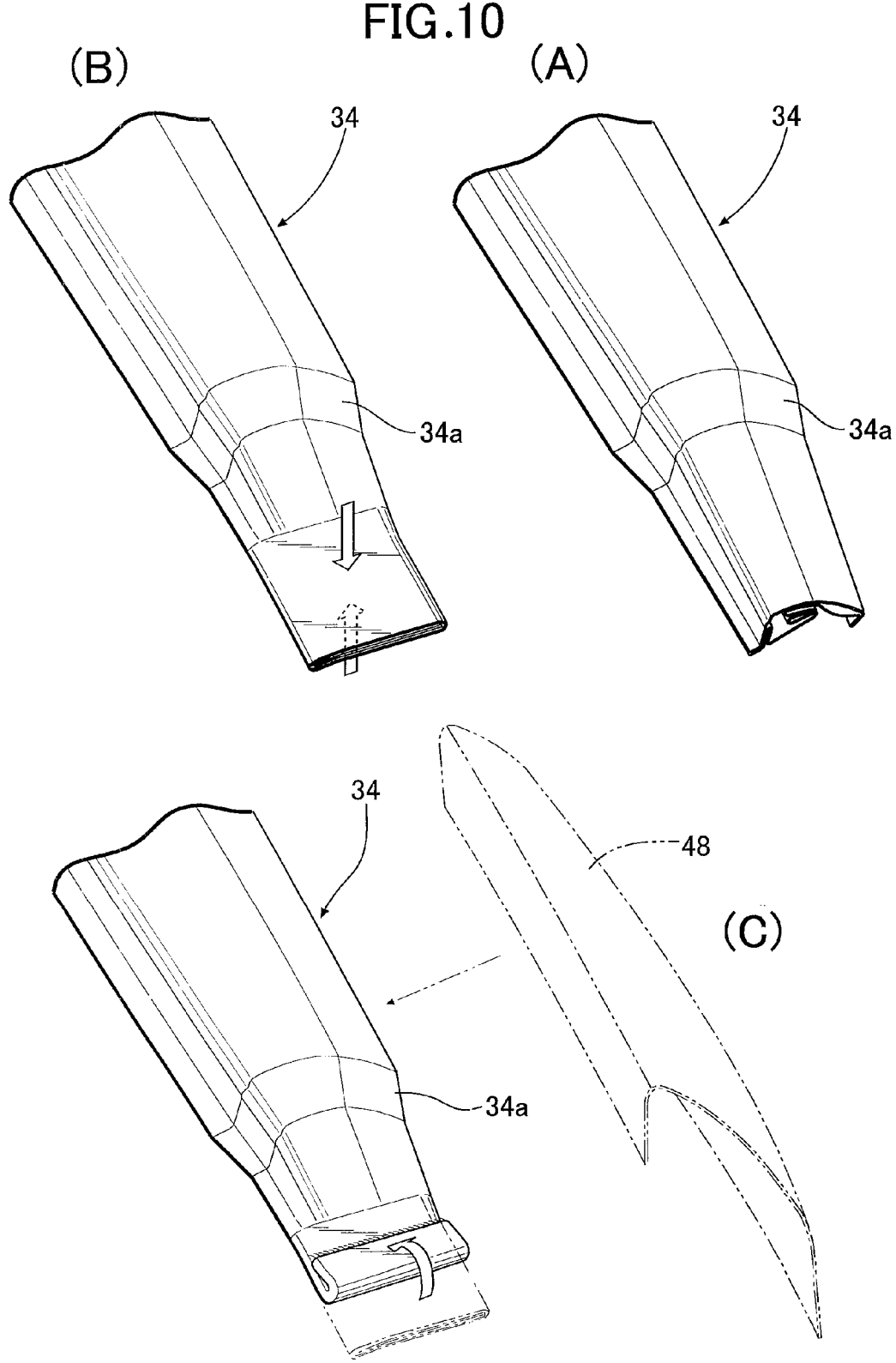
FIG. 10 is a perspective view of a lower part of the front pillar (fourth embodiment).

FIG. 9 and FIG. 10 show a fourth embodiment of the present invention.

The fourth embodiment is a modification of the third embodiment; one point of difference from the third embodiment is that part of a first portion 42b of an expansion portion 42 of an airbag 34 curves rearward and is in contact with an outer face of an outer panel 45. As a result, when a worker pushes an exposed face 41 of a front pillar 15 with a hand when washing the vehicle or applying wax, the first portion 42b of the expansion portion 42 is thrust against the outer face of the outer panel 45, thus maintaining the rigidity of the exposed face 41.

A second point of difference is that the first portion 42b of the expansion portion 42 of the airbag 34 is folded a plurality of times in a zig-zag manner so as to follow a rear face of the exposed portion 41. This enables the deployment allowance of the expansion portion 42 to be increased, thereby further increasing the diameter of the airbag 34 when deployment is completed.

A third point of difference is that the lower end of the airbag 34 is collapsed and then folded to close it instead of the opening at the lower end being closed by welding of the cap 47. By so doing, the cap 47 becomes unnecessary, and it becomes possible to cut the number of components.

Other operational effects of this fourth embodiment are the same as the above-mentioned operational effects of the third embodiment.

Fifth Embodiment

Figure 11:
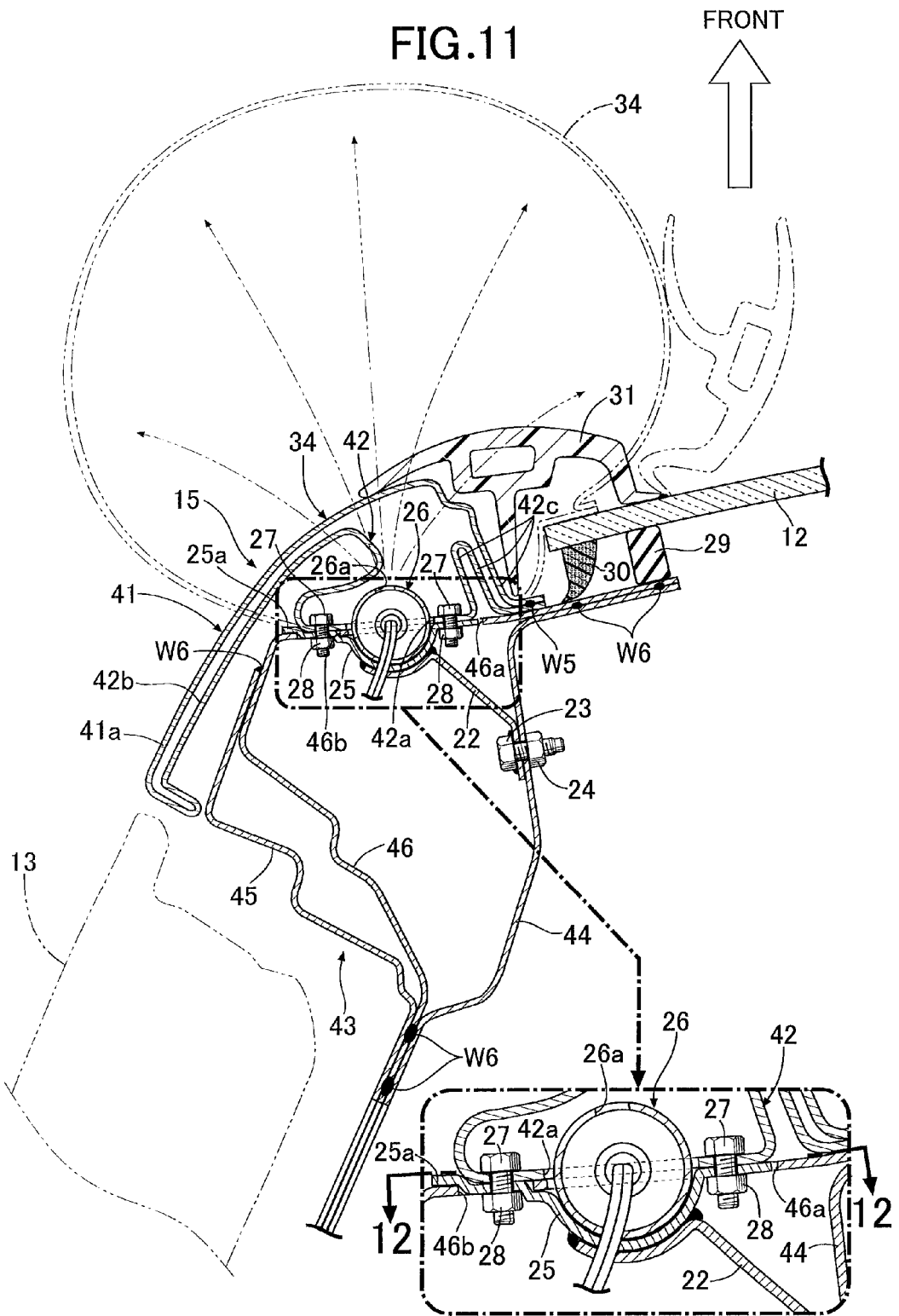
FIG. 11 is a diagram showing the structure of a mounting part for an inflator related to a fifth embodiment (fifth embodiment).
Figure 12:
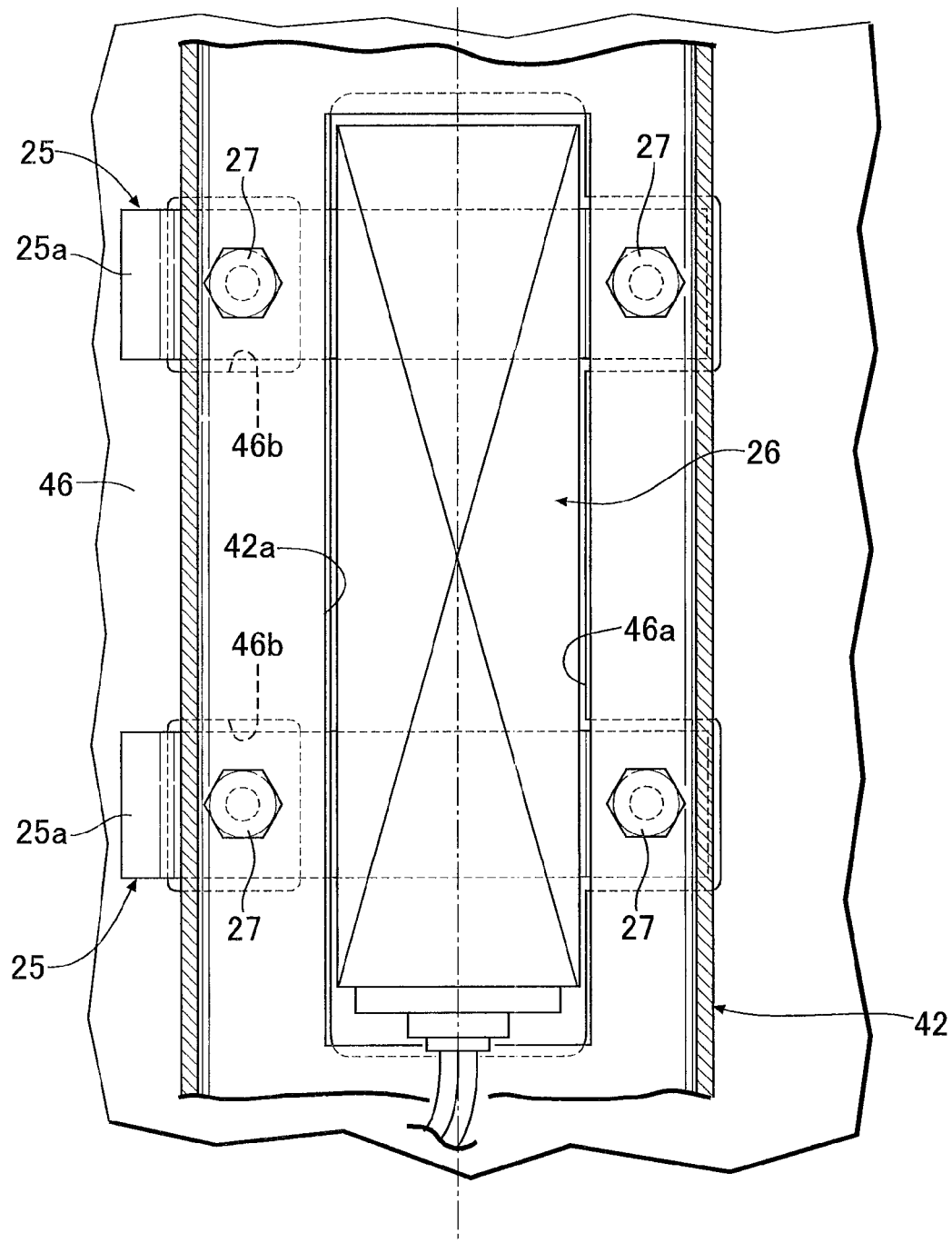
FIG. 12 is a sectional view along line 12-12 in FIG. 11 (fifth embodiment).

FIG. 11 and FIG. 12 show a fifth embodiment of the present invention.

The fifth embodiment is a modification of the third embodiment, and only the structure of a mounting part of an inflator 26 is different. That is, two inflator support members 25 and 25 welded to two brackets 22 and 22 fixed to an inner panel 44 by bolts 23 and 23 and nuts 24 and 24 include latching claws 25a and 25a at one end, and these latching claws 25a and 25a engage with latching holes 46b and 46b formed in a stiffener 46.

Therefore, when an inflated and deployed airbag 34 restrains a pedestrian, a rearward load that the airbag 34 receives is transmitted from the latching claws 25a and 25a of the two inflator support members 25 and 25 to the stiffener 46 and supported, thus restricting backward movement of the airbag 34 and stabilizing its position.

Embodiments of the present invention are explained above, but the present invention is not limited to the above-mentioned embodiments and may be modified in a variety of ways as long as the modifications do not depart from the spirit and scope thereof.

For example, in the embodiments the airbag device is applied to the front pillar 15 of an automobile, but it may be applied to any other place.

Furthermore, in the third and fourth embodiments, the airbag 34 may be formed by extrusion molding instead of roll forming.

The invention claimed is:

1. A pedestrian protection airbag device arranged at a front pillar of a vehicle, said device comprising a metal airbag having a closed cross section and comprising an exposed portion and an expansion portion, said exposed portion serving as a visibly exposed decorative surface of the front pillar, said expansion portion being invisibly covered and expandably folded, the airbag being inflated by high pressure gas generated by an inflator at the time of a collision of the vehicle to thus protect a pedestrian from the impact of the collision, wherein said decorative surface is arranged for providing, in cooperating with a molding, a connection between an outer edge in a vehicle width direction of a front windshield and a front edge of a front door.

2. The pedestrian protection airbag device according to claim 1, wherein at least part of the inflator is housed in the interior of the airbag.

3. The pedestrian protection airbag device according to claim 1, wherein the airbag forms a substantially cylindrical shape in a deployed state.

4. The pedestrian protection airbag device according to claim 3, wherein the airbag is formed by joining a first metal member forming the exposed portion and a second metal member forming the expansion portion.

5. The pedestrian protection airbag device according to claim 4, wherein the second metal member is one second metal member and further comprising an other second metal member, wherein the airbag is formed by providing a connection between the inflator and opposite edges of the first metal member by the second metal members.

6. The pedestrian protection airbag device according to claim 4, wherein the exposed portion and the expansion portion of the airbag are formed integrally by roll forming or extrusion molding.

7. A pedestrian protection airbag device comprising a metal airbag having a closed cross section and comprising an exposed portion that is visibly exposed and an expansion portion that is invisibly covered and expandably folded, the airbag being inflated by high pressure gas generated by an inflator at the time of a collision of a vehicle to thus protect a pedestrian from the impact of the collision, wherein the exposed portion of the airbag forms a decorative surface of a front pillar, wherein the airbag forms a substantially cylindrical shape in a deployed state, wherein the airbag is formed by joining a first metal member forming the exposed portion and a second metal member forming the expansion portion, wherein the exposed portion and the expansion portion of the airbag are formed integrally by roll forming or extrusion molding, wherein the airbag forms part of the front pillar, the inflator is disposed in a middle part in a vehicle width direction of the expansion portion, and a part of the expansion portion that is further inside in the vehicle width direction than the inflator is folded in a vehicle body fore-and-aft direction so that the folds overlap one another.

8. The pedestrian protection airbag device according to claim 7, wherein a part of the expansion portion that is further outside in the vehicle width direction than the inflator is made to follow a rear face of the exposed portion.

9. The pedestrian protection airbag device according to claim 8, wherein the exposed portion covers a section between an outer edge in a vehicle width direction of a front windshield and a front edge of a front door.

10. A pedestrian protection airbag device comprising a metal airbag having a closed cross section and comprising an exposed portion that is visibly exposed and an expansion portion that is invisibly covered and expandably folded, the airbag being inflated by high pressure gas generated by an inflator at the time of a collision of a vehicle to thus protect a pedestrian from the impact of the collision, wherein the exposed portion of the airbag forms a decorative surface of a front pillar, wherein the airbag forms a substantially cylindrical shape in a deployed state, wherein the airbag is formed by joining a first metal member forming the exposed portion and a second metal member forming the expansion portion, wherein the exposed portion and the expansion portion of the airbag are formed integrally by roll forming or extrusion molding, wherein the front pillar comprises a front pillar main body which includes a front face that is parallel to a front windshield and a side face that curves from the front face toward the rear of a vehicle body, the inflator is disposed on the front face, and a part of the expansion portion that is further outside in a vehicle width direction than the inflator comprises a first portion that extends along a rear face of the exposed portion at a position far from the inflator and a second portion that is folded in a zig-zag manner in the vehicle width direction at a position close to the inflator.

11. The pedestrian protection airbag device according to claim 10, wherein a middle part of the first portion is curved rearward so as to abut against the side face of the front pillar main body.

* * * * *